United States Patent [19]
Siddle et al.

[11] Patent Number: 5,716,167
[45] Date of Patent: Feb. 10, 1998

[54] HIGH-SPEED, CARTRIDGE-TYPE MILLING CUTTER

[75] Inventors: David R. Siddle, Greensburg; Ted R. Massa, Latrobe; John S. VanKirk, Murrysville, all of Pa.; Kenneth M. Malott, Williamsburg, Ohio

[73] Assignee: Kennametal Inc., Latrobe, Pa.

[21] Appl. No.: 783,735

[22] Filed: Jan. 16, 1997

Related U.S. Application Data

[63] Continuation of Ser. No. 466,812, Jun. 6, 1995, abandoned.

[51] Int. Cl.$^6$ ........................................ B23C 5/24
[52] U.S. Cl. .......................... 407/36; 407/40; 407/44; 407/53
[58] Field of Search .................... 407/34, 36, 38, 407/40, 44, 53, 56

[56] References Cited

U.S. PATENT DOCUMENTS

| | | | |
|---|---|---|---|
| 510,269 | 4/1893 | Arai et al. | 407/38 X |
| 709,526 | 9/1902 | Taylor et al. | |
| 1,768,132 | 6/1930 | Miller . | |
| 3,121,939 | 2/1964 | Williams | 29/96 |
| 3,303,556 | 2/1967 | Pinkowski | 29/105 |
| 3,587,151 | 6/1971 | Nystrom | 29/105 |
| 3,739,442 | 6/1973 | Lovendahl | 29/105 R |
| 3,791,429 | 2/1974 | Morris | 144/218 |
| 3,831,237 | 8/1974 | Gunsalus | 29/105 |
| 3,839,772 | 10/1974 | Shimomura et al. | 29/105 A |
| 3,887,975 | 6/1975 | Sorice et al. | 29/105 R |
| 3,946,474 | 3/1976 | Hahn et al. | 29/105 R |
| 4,024,615 | 5/1977 | Lieser | 29/105 R |
| 4,303,113 | 12/1981 | Anderson | 144/230 |
| 4,330,227 | 5/1982 | Raye et al. | 407/36 |
| 4,349,057 | 9/1982 | Bachmann et al. | 144/230 |
| 4,470,731 | 9/1984 | Erkfritz | 407/38 |
| 4,487,240 | 12/1984 | Bergler | 144/230 |
| 4,566,826 | 1/1986 | Dickinson | 407/37 |
| 4,658,875 | 4/1987 | Grabovac | 144/230 |
| 4,776,639 | 10/1988 | Braun et al. | 299/91 |
| 4,932,813 | 6/1990 | Qvart | 407/46 |

(List continued on next page.)

FOREIGN PATENT DOCUMENTS

| | | |
|---|---|---|
| 2077756 | 11/1971 | France . |
| 1373460 | 11/1974 | United Kingdom . |
| 1414775 | 11/1975 | United Kingdom . |
| WO80/02812 | 12/1980 | WIPO . |

OTHER PUBLICATIONS

Astrop, A. W., "A new range of versatile indexable–tip facing cutters," Machiner and Production Engineering, Aug. 8, 1973, p. 167 and 168.

International Search Report for PCT/US96/03033 Mailed Jun. 14, 1996.

*Primary Examiner*—Daniel W. Howell
*Assistant Examiner*—Henry W. H. Tsai
*Attorney, Agent, or Firm*—Stanislav Antolin

[57] ABSTRACT

A cartridge-type milling cutter is provided having a cartridge mounting mechanism that resists the centrifugal load applied to the cartridges at high rotational speeds. The milling cutter includes a generally cylindrical cutter body, at least one replaceable tool cartridge having a trailing face, and a leading face having a cutting insert for cutting a workpiece, and a mounting mechanism for detachably securing the tool cartridge onto the cutter body. The mounting mechanism includes a recess in the cutter body for receiving the cartridge that includes a radially canted wall for providing dovetail-type resistance to radial movement of the cartridge, and at least one compressively loaded set screw in the cutter body for compressively engaging the leading face of the cartridge in order to seat and retain it within the recess. During the operation of the cutter, the centrifugal load is substantially borne by the combination of the radially canted wall and the set screw. The mounting mechanism preferably also includes a screw, optionally radially-oriented, that passes through a through bore in the sides of the tool cartridge for providing additional insurance against the loosening or breaking away of the cartridge during high speed operation.

27 Claims, 3 Drawing Sheets

U.S. PATENT DOCUMENTS

| | | | |
|---|---|---|---|
| 4,936,718 | 6/1990 | Proffitt | 407/36 |
| 5,033,916 | 7/1991 | Dunklau | 407/34 X |
| 5,102,268 | 4/1992 | Mitchell | 407/36 |
| 5,133,394 | 7/1992 | Landtwing | 144/230 |
| 5,209,610 | 5/1993 | Arai et al. | 407/36 |
| 5,236,288 | 8/1993 | Flueckiger | 407/36 |
| 5,395,186 | 3/1995 | Qvart | 407/46 |

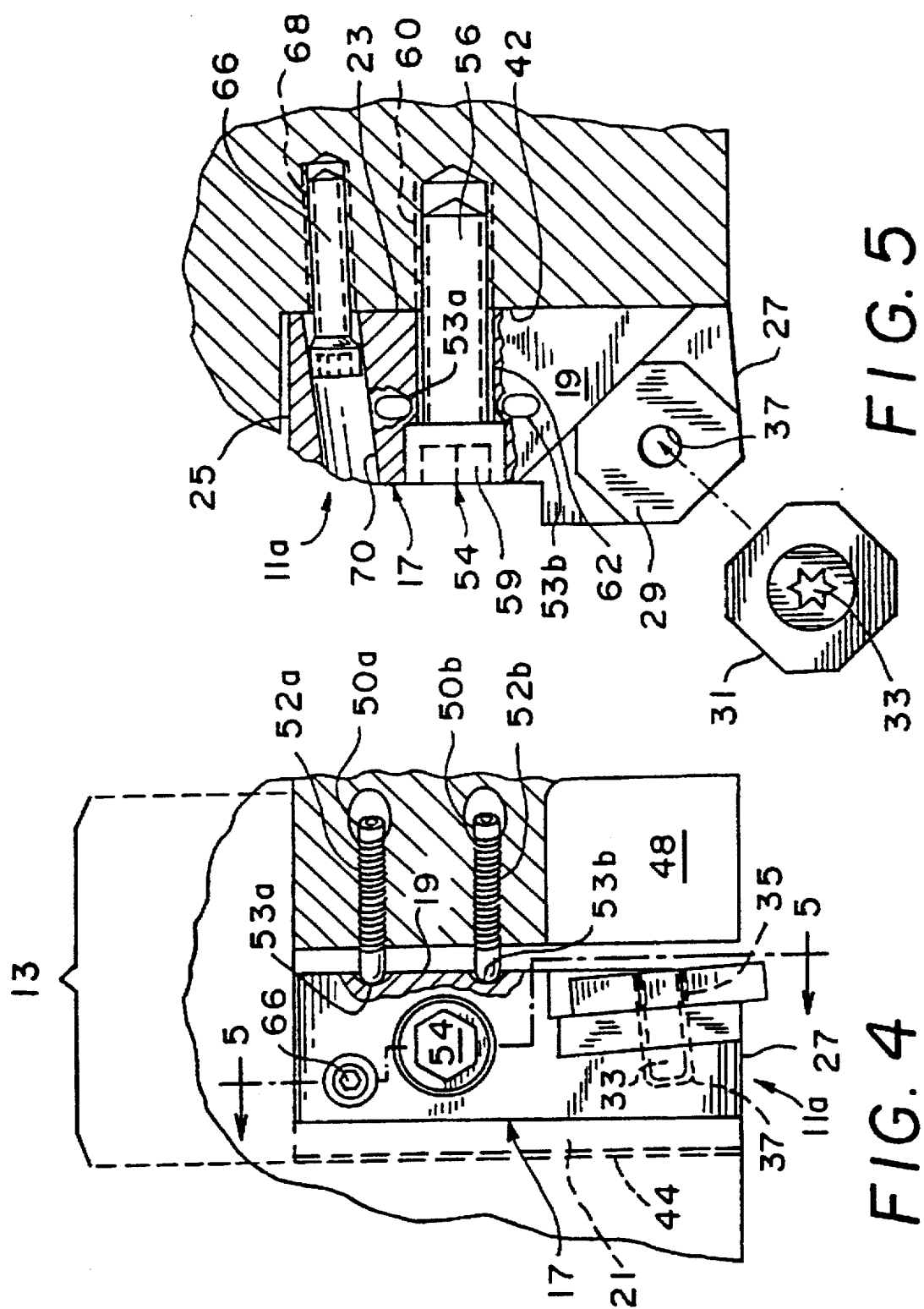

HIGH-SPEED, CARTRIDGE-TYPE MILLING CUTTER

This application is a continuation of application Ser. No. 08/466,812 filed on Jun. 6, 1995, now abandoned.

BACKGROUND

This invention generally relates to milling cutters that use replaceable tool cartridges, and is particularly concerned with a tool cartridge mounting mechanism that more effectively resists the centrifugal forces associated with higher operating speeds.

Milling cutters for cutting workpieces (e.g., metallic, polymeric, wooden, ceramic, and composites of combinations thereof) are well known in the prior art. Such cutters generally comprise a cylindrical cutter body having a spindle on one side for attachment to a source of rotary power, and a plurality of cutting inserts mounted around the outer side of the body for cutting a workpiece. The cutting inserts are typically clamped or screw-mounted into pockets present around the periphery of the cutter body. Because the pockets have to conform in part to the shape of the inserts to adequately stabilize them during a cutting operating, such milling cutters are limited in the number of types of inserts that they can use.

To overcome this problem, milling cutters using replaceable tool cartridges have been developed. In such cutters, the cutting inserts are retained in a pocket present on the leading face of a tool cartridge which in turn are detachably mounted in recesses in the cutter body. The use of tool cartridges enables a single milling cutter to advantageously accommodate a large number of differently-shaped cutting inserts. The design of many such cartridge-type cutters conveniently allows the cartridges to be installed and removed from the side of the cutter body, where access is easiest for the machine operator. The use of such cartridges further allows the use of adjustment assemblies formed from a combination of mounting screws for adjusting the height of the tool cartridges within their respective recesses in the cutter body so that the cutting edges of the inserts may be positioned on the same plane. The proper use of such an adjustment assembly insures that the inserts will share equally in the cutting task, and results in fewer tool marks in the resulting cut. An example of a particularly well designed height adjusting assembly may be found in U.S. Pat. No. 5,102,268, invented by Robert N. Mitchell, and assigned to Kennametal Inc., the entire specification of which is incorporated herein by reference.

While cartridge-type milling cutters constitute a major advance in the machine tool art, the applicants have observed that the mounting mechanisms that secure the cartridges to the cutter body are incompatible with the high-speed use of the milling cutter. This is a significant drawback, as higher speeds not only increase productivity, but can also result in smoother, better quality cuts. Such prior art mounting mechanisms generally comprise a radially-oriented slot or recess into which the tool cartridge is received, along with a radially-oriented screw for securing the cartridge into its respective recess. The side access that such a mechanism provides makes it easy for the cutter operator to quickly change cartridges. Moreover, at moderate operating speeds, such an arrangement is entirely satisfactory for resisting the centrifugal forces experienced by the tool cartridge, as well as the twisting forces applied to the cartridge by the insert as a result of a cutting operation. However, if such a cutter were operated at substantially higher speeds, the tensile and shear forces applied to the mounting screws could cause them to break due to the large centrifugal load applied to these screws from the weight of the tool cartridge. The inability of such cartridge-type milling cutters to operate at very high speeds not only limits their productivity, but also the smoothness or surface finish of the resulting cut.

Clearly, there is a need for a mounting mechanism for safely securing a tool cartridge into its respective recess in a milling cutter even when the cutter is operated at high rotational speeds. Ideally, such a mounting mechanism would conveniently allow the machine operator to readily install and remove different tool cartridges from the sides of the cutter body where access is easiest. Additionally, such a mounting mechanism should not be difficult to machine into the periphery of the cutter body. Finally, it would be desirable if such a mounting mechanism were compatible with assemblies for adjusting the height of the cartridge within its respective recess so that all of the cutting edges of the various inserts may advantageously be positioned on the same plane.

SUMMARY

Generally speaking, the invention is a milling cutter particularly adapted for high speed operation which overcomes the limitations associated with the prior art. To this end, the milling cutter of the present invention comprises, consists essentially of, or consists of a mounting mechanism for detachably securing a tool cartridge onto a cutter body that includes a recess for receiving the cartridge having a radially-canted wall for providing dovetail-type resistance to a centrifugal load applied to the cartridge, and at least one compressively loaded set screw for engaging the leading face of the cartridge. The combination of the canted wall and set screw receives and retains the cartridge within the recess and bears a substantial portion of the centrifugal load experienced by the cartridge under high speed operating conditions. As added insurance against the detachment of the tool cartridge from the cutter body at high speeds, the mounting mechanism further may include a screw, optionally radially-oriented, that extends through a bore in the tool cartridge for engaging an inner side of it against a mating wall of the recess. However, while this screw, which may be optionally radially-oriented, may share some of the centrifugal load applied to the tool cartridge during high speed operation, a remainder or most of the load is borne by the combination of the radially-canted wall and the compressively loaded set screw.

While the radially-canted wall of the cartridge-receiving recess may be canted over a broad range of angles, an angle between about 5° and 15° with respect to the radius of the cylindrical cutter body is preferred, with an angle of 10° most preferred. Such an angle has been found to provide substantial dovetail-type resistance to the centrifugal loads applied to the tool cartridge without significantly hindering the installation of such tool cartridges around the sides of the cutter body.

In a preferred embodiment, the mounting mechanism includes at least one additional compressively loaded set screw and, thus, at least one pair of compressively loaded set screws which are spaced apart in the axial direction so that these screws can resist twisting forces applied to the tool cartridge during a cutting operation while they share in resisting the centrifugal load applied to such a cartridge. To further enhance the stability of the mounting mechanism, the leading face of the tool cartridge may include axial indentations for receiving the distal ends of the at least one pair of set screws.

The mounting mechanism may also include a height adjustment assembly such as that disclosed and claimed in previously mentioned U.S. Pat. No. 5,102,268. If such an adjustment assembly is present, the various height adjustment screws may first be turned to slide the tool cartridge to the desired height within the recess of the mounting means. Then, the compressively loaded set screws may then be tightened to secure the cartridge and its associated cutting insert at the desired height. Finally, the mounting screw, which may be radially-oriented, may then be tightened.

By substantially reducing both the tensile and shear forces applied to the mounting screws as a result of centrifugal loading, the inventors have found that the mounting mechanism of the invention allows the milling cutter to be operated at approximately a five fold increase in RPMs over a typically used range of cutter diameters. In particular, the inventors have found that an about 152 millimeter (six inch) diameter cartridge-type milling cutter can be operated safely at a speed of 5300 RPMs when the mounting mechanism of the invention is used, whereas such a milling cutter could only be operated at a speed of 1100 RPMs when conventional cartridge-retaining mounting mechanisms were employed. Moreover, the design of the invention preserves the ability of the cartridge to be conveniently mounted or removed from the side of the cutter body.

The invention illustratively disclosed herein may suitably be practiced in the absence of any element, step, component, or ingredient which is not specifically disclosed herein.

BRIEF DESCRIPTION OF FIGURES

These and other features, aspects, and advantages of the present invention will become better understood with reference to the following description, appended claims, and accompanying drawings where:

FIG. 4 is a partial cross-sectional front view of a tool cartridge secured in the body of the milling cutter by the mounting mechanism of the invention; and FIG. 5 is a partial cross-sectional front view of the tool cartridge illustrated in FIG. 4 along the line 5—5.

DETAILED DESCRIPTION

Figure 1:
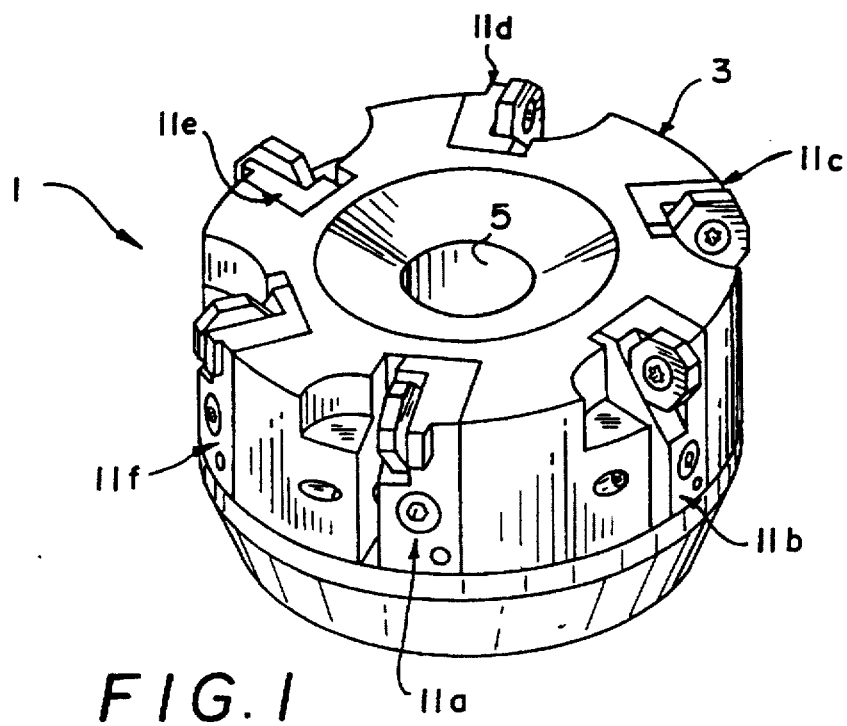
FIG. 1 is a perspective bottom view of the high-speed, cartridge-type milling cutter of the invention.
Figure 2:
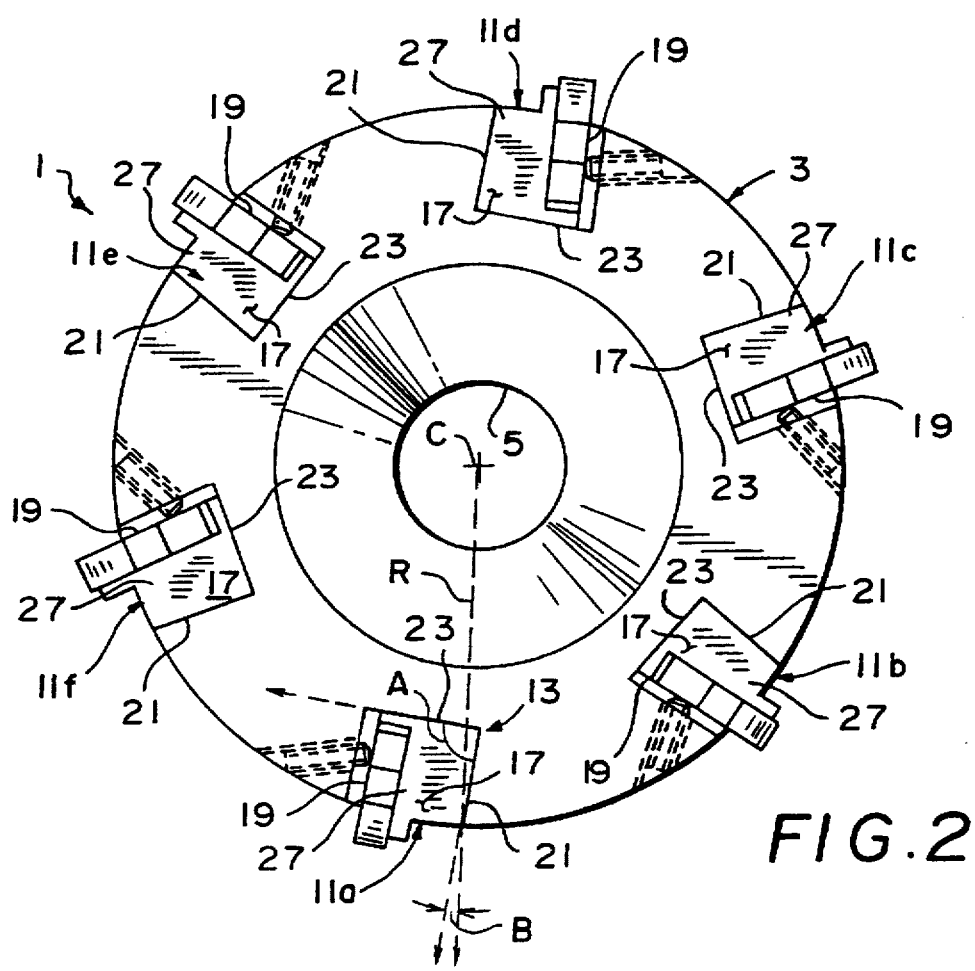
FIG. 2 is a plan view of the milling cutter shown in FIG. 1.
Figure 3:
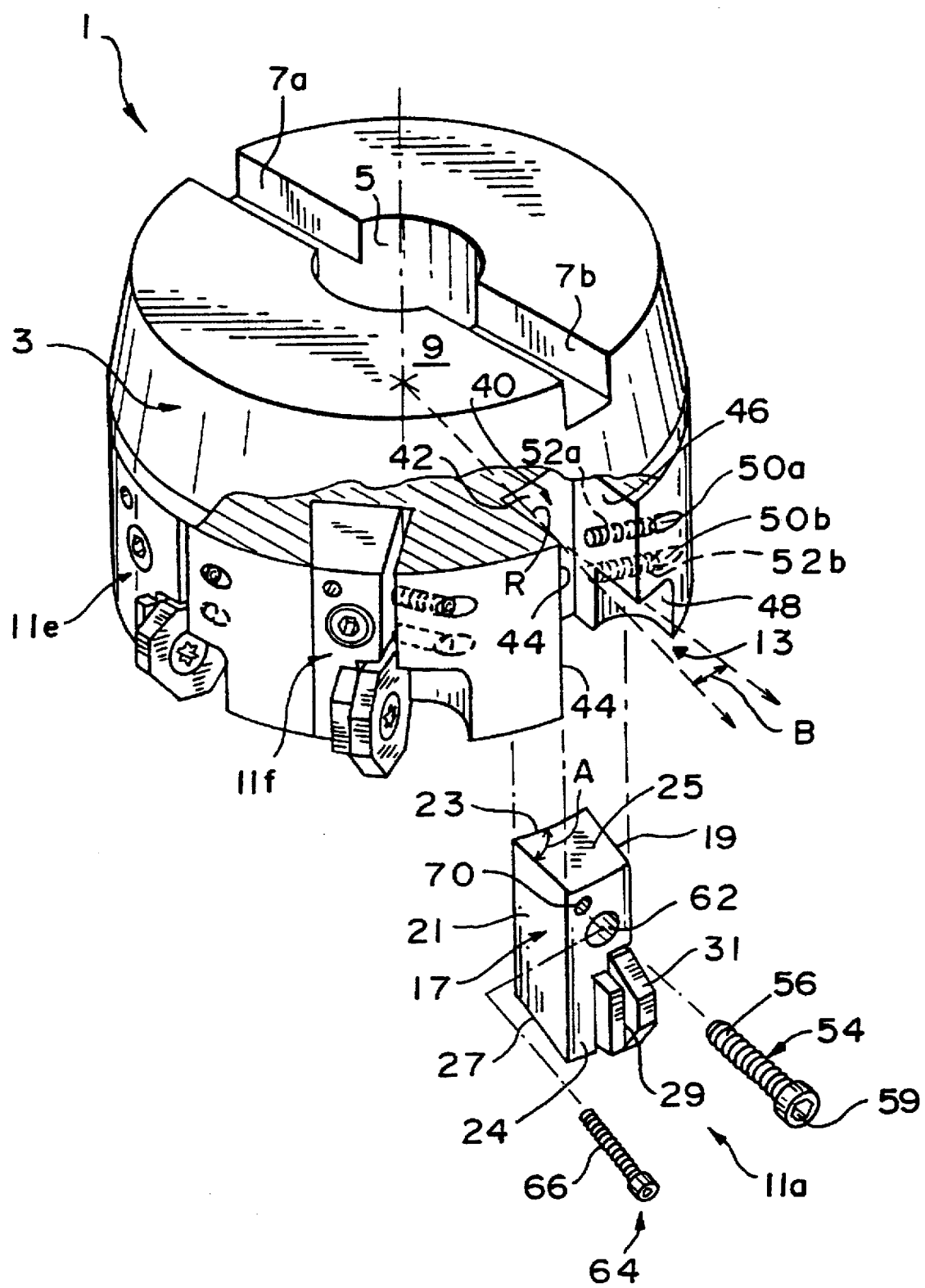
FIG. 3 is a perspective top view of the milling cutter of the invention, illustrating both a tool cartridge and a mounting mechanism in partially exploded form.

With reference now to FIGS. 1, 2, and 3, wherein like numerals designate like components throughout all of the several figures, the milling cutter 1 of the invention comprises a generally cylindrical cutter body 3 which may be formed, for example, from alloy steel. The cutter body 3 includes a centrally disposed circular aperture 5, as well as a pair of opposing drive slots 7a,b on its top wall 9. A plurality of tool cartridges 11a–f are disposed around the periphery of the cutter body 3. As will be described in greater detail hereinafter, each of these tool cartridges 11a–f is secured in its respective position along the periphery of the body 3 by means of a mounting mechanism 13.

As shown in FIGS. 2, 3, and 5, each of the tool cartridges 11a–f includes a cartridge body 17 having generally rectangular leading face 19 and trailing face 21 interconnected by rectangular inner wall 23 and outer wall 24. Angle A between the trailing face 21 and inner wall 23 is an acute angle of approximately 80° (as may best be seen in FIG. 2) such that top wall 25 and bottom wall 27 of body 17 of each of the tool cartridges 11a–f are, in this example, trapezoidal in shape. While the angle A between the trailing face 21 and inner wall 23 may vary, angle A should in all cases substantially correspond to the angle between the walls (e.g., inner wall 42 and trailing wall 44) of the recess 40 of the mounting mechanism 13 that receive it. Finally, as is best seen in FIG. 5, the leading face 19 of each cartridge body 17 includes a pocket 29 for receiving a cutting insert 31. The pocket 29 is partially complementary in shape to the sidewalls of the cutting insert 31 to assist in accurate placement of cutting insert 31 and, optionally, to prevent the insert 31 from rotating in response to the forces applied to its cutting edges during a cutting operation. A mounting screw 33 that extends through a through bore 35 in the insert 31 and engages a threaded bore 37 in the cartridge body 17 securely mounts the insert 31 into the pocket 29. Alternatively, a clamping mechanism of a type known in the prior art may be used to secure the insert 31.

With reference to FIGS. 3 and 4, the mounting mechanism 13 that secures each of the tool cartridges 11a–f onto the cutter body 3 generally comprises a recess 40, one or more set screws 50a,b for seating the body 17 of each of the tool cartridges 11a–f into the recess 40, and a radially-oriented retaining screw 54 for assisting the set screws 50 in retaining the cartridge body 17 in the recess 40.

The recess 40 of the mechanism 13 includes a flat, rectangular inner wall 42 that may be tangentially oriented with respect to the radius R of the cylindrical cutter body 3. Recess 40 further includes a rectangular trailing wall 44 that is inclined or canted at angle B with respect to the radius R. While trailing wall 44 may be canted anywhere from between about 5° and 15° with respect to the radius R, angle B is canted 10° in this preferred embodiment. Additionally, when the recess inner wall 42 is tangentially oriented, angles B and A are complementary to one another to insure a gap-free fit in this area between the cartridge body 17 and recess 40. The purpose of radially canting trailing wall 44 is to apply a dovetail-like retaining force on the body 17 on a complementarily-shaped tool cartridge inserted into the recess 40 to resist centrifugal forces applied to the tool cartridge during the rotation of the cutter body 3. While a broad range of canting angles would be operable, the inventors have found that the provision of a 10° canting angle onto the trailing wall 44 with respect to the radius R produces the desired, dovetail-like retention of the tool cartridge without rendering the recess 40 difficult to machine. In this preferred embodiment, the angle B has been measured from a radius R extending through the intersection of the trailing wall 44 and the periphery of the cutter body 3. More generally, the angle B may be taken between a radius R that extends through the center of mass of the cartridges 11a–f and the trailing wall 44 of the recess 40. The present invention is intended to encompass any configuration where the canting of the trailing wall 44 relative to a radius R extending through the cartridges 11a–f results in the desired dovetail-type resistive force against centrifugal forces applied to the cartridges 11a–f. The recess 40 of each mounting mechanism 13 further also has a leading wall 46 which, at its bottom portion, includes a scalloped portion 48 to facilitate the expulsion of metal chips produced by the cutting edges of the insert 31 during a cutting operation. The scalloped portion 48 is smaller than counterpart scalloped portions in the cutter bodies of conventional milling cutters operable at lower speeds as the chips produced by the high speed operation of the cutter 1 produces smaller chips that require less open space to expel since the workpiece is cut more frequently.

The set screws 50a,b of the mounting mechanism 13 are engaged in threaded bores 52a,b which are oriented substantially tangentially with respect to the radius R of the cutter body 3. Such an orientation is important, as it insures that the reactive load applied to the set screws 50a,b by the cartridge body 17 during the rotation of the cutter body 3 will be primarily a compressive load which the set screws 50a,b can easily bear, as opposed to a shear load which is much more apt to break the screw shanks. To assist the set screws 50a,b in securing the cartridge body 17 into the recess 40, indentations 53a,b are provided on the leading face 20 of the cartridge body 17 to receive the ends of these screws. These indentations 53a,b are elongated, shallow, and substantially larger than the ends of the set screws 50a,b that they receive. Such dimensioning insures that the indentations 53a,b will not interfere with the operation of any height adjustment assembly included in the milling cutter.

The radially-oriented retaining screw 54 of the mounting mechanism 13 includes a threaded distal end 56 on one end, and a screw head 59 on its other end. The threaded distal end 56 may be screwed into a radially-oriented threaded bore 60 having an open end in the inner wall 42 of the recess 40. A radially-oriented through bore 62 conducts the shank of the retaining screw 54 through the cartridge body 17. Unlike threaded bore 60, through bore 62 is smooth, and has a diameter somewhat larger than the outer diameter of the shank of the retaining screw 54. As will become more evident presently, such dimensioning allows a certain amount of slack in the axial direction along the recess 40 which in turn allows some degrees of height adjustment for the cartridges 11a-f.

The mounting mechanism 13 of the invention is advantageously compatible with a height adjustment assembly 64. Assembly 64 includes a round head screw 66 having a threaded shank that is engagable within a radially-oriented, threaded bore 68 having an open end in the inner wall 42 of the recess 40. The rounded head of the screw 66 is slidably movable along the smooth walls of a through bore 70 in the body 17 of each of the cartridges 11a-f that is inclined with respect to the horizontal. The inclination of the through bore 70 causes the cartridge body 17 to move upwardly or downwardly within the recess 40 depending upon whether the screw 66 is screwed into or out of the threaded bore 68.

In operation, a tool cartridge 11a-f is installed in the recess 40 of the mounting mechanism 13 by first engaging the radially-oriented retaining screw 54 into the threaded bore 60. Next, the height of the cartridge body 17 within the recess 40 may be adjusted to align the cutting edges of the various cutting insert 31 to the same height. As previously described, this step may be accomplished by turning the round head screw 66 to a greater or lesser distance within the inclined through bore 70 in the cartridge body 17. After the cutting edges of all the inserts 31 have been height adjusted in this manner, the set screws 50a,b of the mounting mechanism 13 may be tightened to securely engage the trailing face 21 and inner wall 23 of the cartridge body 17 against the radially-canted trailing wall 44 and inner wall 42 of the recess 40. When the cutter body 3 is rotated incident to a cutting operation, the centrifugal force experienced by the tool cartridges 11a-f is resisted primarily by the partial-dovetail retaining forces applied between the radially-canted trailing wall 44 of the recess 40 and the trailing face of the cartridge body 17, in combination with the pressure applied by the set screws 50a,b. Of course, the radially-oriented retaining screw 54 shares some of the load generated by such centrifugal force. In doing so, retaining screw 54 provides an additional level of insurance that the body 17 of each of the tool cartridges 11a-f will remain securely mounted within the recess 40 of the mounting mechanism 13 even when the cutter body 3 is rotated at very high cutting speeds.

While this invention has been described with respect to a particular preferred embodiment, various additions, modifications, and variations of the invention will become evident to persons of ordinary skill in the art. All such variation, additions, and modifications are intended to be encompassed within the scope of this patent, which is limited only by the claims appended hereto.

What is claimed:

1. A milling cutter for cutting a workpiece, comprising:
    a generally cylindrical cutter body rotatable about an axis;
    at least one replaceable tool cartridge having leading and trailing faces, said leading face including a cutting insert for cutting a workpiece, and
    a mounting mechanism for detachably securing said tool cartridge onto said cutter body, including:
        a recess in said cutter body for receiving said cartridge including a trailing wall and an inner wall, wherein the trailing wall is canted with respect to a radius of said cutter body and at an acute angle with respect to the inner wall thereby providing dovetail type resistance to a centrifugal load applied to said cartridge, and
        at least one compressibly loaded retainer in said cutter body for compressively seating and retaining said cartridge in said recess such that said centrifugal load is borne substantially by said radially canted trailing wall and said at least one compressively loaded retainer.

2. The milling cutter defined in claim 1, wherein said inner wall abuts an inner side wall of said cartridge.

3. The milling cutter defined in claim 2, wherein said mounting mechanism further includes a radially oriented retainer for resisting said centrifugal load and for forcefully engaging said inner side wall of said cartridge against said inner wall of said recess, and wherein the combination of said radially canted wall and said at least one compressively loaded retainer substantially reduces said centrifugal load on said radially oriented retainer.

4. The milling cutter defined in claim 1, wherein said mounting mechanism further includes a height adjustment assembly for adjusting the position of said cartridge in said recess along a line parallel to the axis of rotation of said cutter body.

5. The milling cutter defined in claim 4, wherein said height adjustment assembly includes an adjustment screw having a head portion, and a threaded shank engageable within a radially oriented bore in said cutter body, and a through bore in said cartridge that is inclined with respect to said radially oriented bore in said cutter body for slidably receiving the head portion of the adjustment screw.

6. The milling cutter defined in claim 1, wherein said radially canted wall is canted between about 5° and 15° with respect to a radius of said cylindrical cutter body.

7. The milling cutter defined in claim 6, wherein said radially canted wall is canted about 10° with respect to a radius of said cylindrical cutter body.

8. The milling cutter defined in claim 1, wherein said leading face of said cartridge includes an indentation for receiving an end of said at least one compressively loaded retainer.

9. The milling cutter defined in claim 1, further comprising a plurality of replaceable tool cartridges, and a mounting mechanism for each of said tool cartridges.

10. The milling cutter defined in claim 1, wherein said leading face of said tool cartridge includes a recess for receiving said cutting insert.

11. A milling cutter for cutting a workpiece, comprising:
a generally cylindrical cutter body rotatable about an axis;
at least one replaceable tool cartridge having a leading face that includes a cutting insert for cutting a workpiece, a trailing face, and inner and outer side walls interconnecting said leading and trailing faces, and
a mounting mechanism for detachably securing said tool cartridge onto said cutter body, including:
a recess in a peripheral portion of said cutter body for receiving said cartridge including an inner wall for abutting said inner side wall of said cartridge and a radially canted trailing wall, at an acute angle with respect to the inner wall, for abutting the trailing face of said cartridge and for providing dovetail-type resistance to a centrifugal load applied to said cartridge, and
at least one compressively loaded retainer in said cutter body having an end for compressively engaging said leading face of said cartridge to seat and retaining said cartridge within said recess such that said centrifugal load is borne substantially by said radially canted trailing wall and said at least one compressively loaded retainer.

12. The milling cutter defined in claim 11, wherein said leading face of said cartridge includes an elongated indentation for receiving said end of said at least one compressively loaded retainer.

13. The milling cutter defined in claim 12, wherein said at least one compressively loaded retainer is threadedly engaged in a bore in said cutter body that is substantially tangentially oriented.

14. The milling cutter defined in claim 11, wherein said mounting mechanism further includes at least one additional compressively loaded retainer in said cutter body having an end for compressively engaging said leading face of said cartridge for both sharing a portion of said centrifugal load and for resisting twisting forces applied to said cartridge.

15. The milling cutter defined in claim 14, wherein said at least one compressively loaded retainer and said at least one additional compressively loaded retainer are spaced apart such that both retainers resist twisting forces applied to said cartridge.

16. The milling cutter defined in claim 11, wherein said radially canted wall is canted between about 5° and 15° with respect to a radius of said cylindrical cutter body.

17. The milling cutter defined in claim 16, wherein said radially canted wall is canted about 10° with respect to a radius of said cylindrical cutter body.

18. The milling cutter defined in claim 11, wherein said mounting mechanism further includes a radially oriented retainer for resisting said centrifugal load and for forcefully engaging said inner side wall of said cartridge against said inner wall of said recess, and wherein the combination of said radially canted wall and said at least one compressively loaded retainer substantially reduces said centrifugal load on said radially oriented retainer.

19. The milling cutter defined in claim 11, wherein said mounting mechanism further includes a height adjustment assembly for adjusting the position of said cartridge in said recess along a line parallel to the axis of rotation of said cutter body.

20. The milling cutter defined in claim 19, wherein said height adjustment assembly includes an adjustment screw having a head portion, and a threaded shank engageable within a radially oriented bore in said cutter body, and a through bore in said cartridge that is inclined with respect to said radially oriented bore in said cutter body for slidably receiving the head portion of the adjustment screw.

21. The milling cutter defined in claim 1, wherein said at least one compressively loaded retainer comprises a screw.

22. The milling cutter defined in claim 3, wherein said radially oriented retainer comprises a screw.

23. The milling cutter defined in claim 8, wherein said at least one compressively loaded retainer comprises a screw.

24. The milling cutter defined in claim 11, wherein said at least one compressively loaded retainer comprises a screw.

25. The milling cutter defined in claim 12, wherein said at least one compressively loaded retainer comprises a screw.

26. The milling cutter defined in claim 14, wherein said retainers comprise screws.

27. The milling cutter defined in claim 15, wherein said retainers comprise screws.

* * * * *